Nov. 3, 1959 F. MINECK 2,911,244
BALL JOINT PRELOADING DEVICE
Filed Sept. 3, 1957

INVENTOR.
FRED MINECK
BY
William S. Grant
ATTORNEY.

United States Patent Office 2,911,244
Patented Nov. 3, 1959

2,911,244

BALL JOINT PRELOADING DEVICE

Fred Mineck, Phoenix, Ariz., assignor to F.M. Research Corporation, Ontario, Calif.

Application September 3, 1957, Serial No. 681,825

3 Claims. (Cl. 287—87)

This invention pertains to improvements in ball joint preloading devices and is particularly directed to improving the front end suspension of motor vehicles.

One of the objects of this invention is to provide a preloading device to eliminate back lash in the ball joints between the wheel spindle and mounting arms of the front end suspension of a motor vehicle.

Another object is to provide an insertable preloading device between the ball socket member and the member clamped to the stem of the ball carried in the socket which may be installed without dissembly of the suspension members of the motor vehicle.

Still another object is to provide a preloading device for ball joint suspension systems which is easy to install and permanent in operation and effectiveness and is not adversely harmed by temperature and moisture conditions.

Further features and advantages of this invention will appear from a detailed description of the drawings in which.

Figure 1:
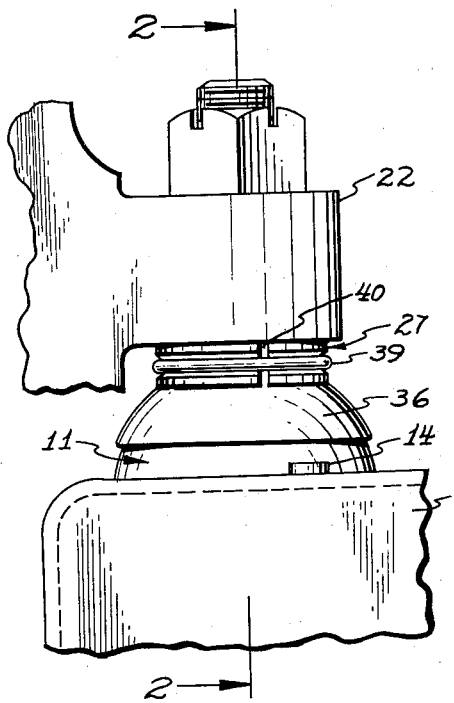
Fig. 1 is an outside view of a ball joint connection for a motor vehicle suspension system to which a device incorporating the features of this invention have been applied.

In an automotive front end suspension system there is provided the usual yoke or wishbone support arm member 10 to which is secured the ball socket member 11 comprising the lower socket member 12 and the upper socket member 13 by suitable bolts 14. A suitable perforation 15 is formed in the upper member 13 through which projects the tapered spindle 16 of the ball 17 carried loosely in the ball socket member 11. Normally the spherical surface 18 of the ball 17 slidingly engages the concave spherical bearing surface 19 of the upper member 13 while a clearance 20 is provided between the concave inner surface 21 of the lower member 12.

Figure 2:
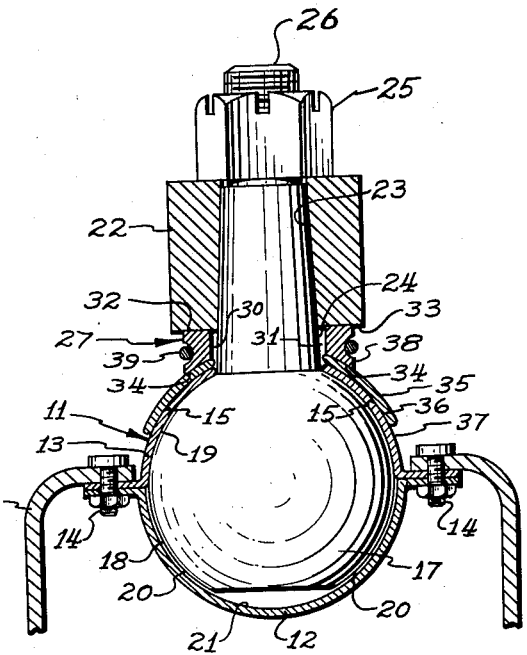
Fig. 2 is a section on the line 2—2 of Fig. 1.
Figure 3:
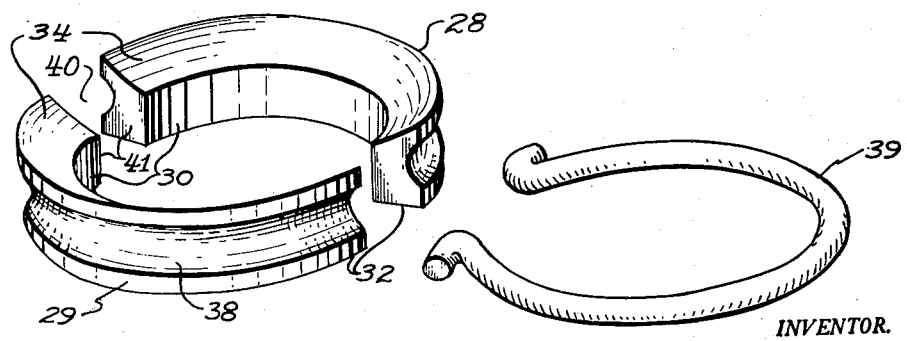
Fig. 3 is an exploded perspective view showing the device incorporating the features of this invention.

The steering spindle member 22 has a tapered bore 23 tightly fitting the tapered surface 24 of the spindle 16 and is locked in position, as shown in Fig. 2, by the jam nut 25 mounted on the threaded upper end 26 of the stem 16. Because of the necessary clearance at 20 in the manufacture and assembly of the ball joint structure rattle and chatter develops under certain severe road conditions where rapid up and down motion of the wheel spindle together with normal restraint of the shock absorber tends to unseat the ball 17 from the inner bearing surface 19 of the upper socket member 13.

In order to maintain a proper preloaded bearing pressure under all operating conditions between the spherical surface 18 of the ball 17 and the inner concave spherical surface 19 of the upper socket member there has been provided a preloading device operating between the steering spindle member 22 and the upper socket member 13 comprising a specially designed thrust washer 27 comprising the segmental members 28 and 29 having an enlarged bore 30 having ample clearance 31 so as not to contact the stem 16. Each of the segmental members 28 and 29 have radially disposed abutment surfaces 32 engaging the radially disposed abutment surface 33 of the steering spindle member 22. The other face of the segmental members 28 and 29 are formed with tapered or concave spherical surfaces 34 engaging the outer convex spherical surface 35 of a suitable spherical washer 36 engaging the outer convex spherical surface 37 of the upper socket member 13. An annular groove 38 is formed in the periphery of the segmental members 28 and 29 in which is placed the snap ring 39 which normally yieldingly urges the segmental members toward each other causing them to ride up on their taper surface 34 to take up all clearance between the steering spindle member and the upper socket member 13 to thus hold firm bearing engagement between the surface 18 of the ball 17 and the inner surface 19 of the upper socket member 11 under all operating conditions. A suitable radial clearance slot 40 is provided between the ends 41 of the segmental members 28 and 29 so that surfaces 32—33 and 34—35 remain firmly seated at all times.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claims are intended to be included herein.

Having thus fully set forth and described this invention what is claimed and desired to be obtained by United States Letters Patent is:

1. In a preloading device for a ball joint comprising a support arm, a ball socket member having a hemispherical bearing surface fixed to said support arm including a perforation in said hemispherical surface, a spindle having a ball formed thereon projecting through said perforation when said ball is in engagement with said hemispherical bearing surface, and a steering spindle member rigidly fixed to said spindle, a preloading device interacting between said ball socket member and said steering spindle member characterized by a plurality of segmental members each having a radially disposed surface on one side thereof engaging said steering spindle member and concave spherical surfaces on the other sides thereof engaging an outer convex spherical surface of said ball socket member, an annular groove formed in the periphery of said segmental members, a clearance bore formed in said segmental members around said spindle, and a snap ring in said annular groove to cause said segmental members to be urged radially inwardly of said spindle.

2. In a preloading device for a ball joint as set forth in claim 1 wherein a hemispherical washer is interspaced between said concave spherical surfaces of said segmental members and said outer convex spherical surface of said ball socket member.

3. In a preloading device for a ball joint as set forth in claim 1 wherein radial clearance slots are provided between the ends of said segmental members when said segmental members are fully engaged with said spindle and ball socket member by said snap ring.

References Cited in the file of this patent

UNITED STATES PATENTS

| | | |
|---|---|---|
| 1,038,085 | Chubbuck | Sept. 10, 1912 |
| 1,208,454 | Baumeyer | Dec. 12, 1916 |
| 2,076,028 | Hufferd | Apr. 6, 1937 |
| 2,257,346 | Paulus | Sept. 30, 1941 |
| 2,595,787 | Heimann | May 6, 1952 |
| 2,631,872 | Wurmser | Mar. 17, 1953 |
| 2,713,806 | Dodge | July 26, 1955 |